(12) United States Patent
Nelson

(10) Patent No.: US 6,883,796 B2
(45) Date of Patent: Apr. 26, 2005

(54) FILM SUPPLY SYSTEM FOR USING WITH A PHOTOSENSITIVE FILM IMAGER

(75) Inventor: Brian D. Nelson, Birchwood, MN (US)

(73) Assignee: Eastman Kodak Company, Rochester, NY (US)

( * ) Notice: Subject to any disclaimer, the term of this patent is extended or adjusted under 35 U.S.C. 154(b) by 66 days.

(21) Appl. No.: 10/377,448

(22) Filed: Feb. 28, 2003

(65) Prior Publication Data

US 2004/0169325 A1 Sep. 2, 2004

(51) Int. Cl.[7] ................................................. B65H 5/14
(52) U.S. Cl. ..................................... 271/3.11; 271/104
(58) Field of Search .............................. 271/3.11, 5, 11, 271/14, 90, 91, 103, 104

(56) References Cited

U.S. PATENT DOCUMENTS

| 4,585,222 A | * | 4/1986 | Nishibori et al. | ........... 271/106 |
| 5,350,166 A | * | 9/1994 | Shimizu et al. | ................ 271/14 |
| 5,876,031 A | * | 3/1999 | Ohkoda et al. | ................ 271/14 |
| 6,139,005 A | | 10/2000 | Nelson et al. | ................ 271/90 |
| 6,260,842 B1 | | 7/2001 | Nelson et al. | .............. 271/145 |
| 6,345,818 B1 | * | 2/2002 | Stephan et al. | ................ 271/91 |

FOREIGN PATENT DOCUMENTS

| JP | 2-158530 A | * | 6/1990 | ............ B65H/3/08 |
| JP | 3-259832 A | * | 11/1991 | ............ B65H/3/08 |
| JP | 4-358636 A | * | 12/1992 | ............ B65H/3/08 |

* cited by examiner

*Primary Examiner*—Donald P. Walsh
*Assistant Examiner*—Mark J. Beauchaine
(74) *Attorney, Agent, or Firm*—Susan L. Purulski

(57) ABSTRACT

A film supply system for use in an imager to separate sheets of photosensitive media from a film cartridge and deliver individual sheet of the photosensitive media to a film transport system. The film supply system comprises: a frame for attachment of the film supply system within the imager; a heel plate pivotably attached to the frame and actuatable by a motor; and a cup plate pivotably attached to the heel plate, the cup plate including at least one suction cup for selectively engaging a sheet of the photosensitive media.

1 Claim, 15 Drawing Sheets

FILM SUPPLY SYSTEM FOR USING WITH A PHOTOSENSITIVE FILM IMAGER

FIELD OF THE INVENTION

The invention relates generally to a system for maintaining and distributing sheets of photosensitive film media within a laser imaging machine. More particularly, it relates to a system configured to receive and open a cartridge of photosensitive film within the imager, and separate and deliver individual sheets of the photosensitive film media from the cartridge to a film transport system of the imager.

BACKGROUND OF THE INVENTION

Light sensitive, photothermographic film is used in many applications ranging from a standard photocopying apparatus, to graphic arts and/or medical imaging/recording printing systems. For example, in the medical industry, laser imaging systems employing photothermographic film are commonly used to produce photographic images from digital image data generated by magnetic resonance (MR), computer tomography (CT) or other types of scanners. Systems of this type typically include a laser imager for exposing an image on the photothermographic film, a thermofilm processor for developing the film through the application of heat, and an image management subsystem for coordinating the operation of the laser imager and the thermofilm processor. The resulting image is available for diagnostic use by medical radiologists and communications to referring physicians and their patients.

Generally speaking, a photosensitive film laser imager includes a film supply system, a film exposure assembly, a film processing station (or developer), a film dispensing area and a film transport system. Each of these components are associated within a relatively large imager housing.

Sheets of unexposed photosensitive film is normally stacked in a sealed, standardized film cartridge, for delivery to the imager. The standard film cartridge can be sealed by a foil cover. During use, the film cartridge is inserted into the film supply system of the imager. The film supply system normally includes mechanisms for unsealing the film cartridge and subsequently removing individual sheets of film. In this regard, the film supply system separates and delivers an individual sheet of photosensitive film from the film cartridge to the film transport system. The film transport system, in turn, delivers the individual sheet of film to the film exposure assembly. Within the film exposure assembly, photographic images are exposed on the film from image data (e.g., digital or analog) using a laser imager. The exposed sheet of film is then transported, via the film transport system, to the film processing station where the film is developed. After thermal processing, the film is cooled and transported to the film dispensing area where the final image is available to the user.

U.S. Pat. No. 6,139,005 (Nelson) and U.S. Pat. No. 6,260,842 (Nelson), both incorporated herein by reference, are directed to film supply systems for use with a photosensitive film imager.

While laser imagers have proven to be highly successful, several potential drawbacks may exist. For example, the film supply system is normally very complex, large and therefore expensive. To accomplish desired film separation, the standard film supply system normally includes several mechanisms and a number of independently driven parts which maneuver the film sheet in different directions to effectuate film separation. This complex approach to separating and delivering sheets of film is normally quite expensive.

Therefore, a substantial need exists for a film supply system configured to meet the design and operational constraints of a photosensitive film laser imager, in a cost-effective manner.

The film supply system of the present invention, also referred to as the Pickup Assembly, is comprised of an integrated pickup mechanism and a feed roller mechanism. The pickup mechanism separates the top sheet of film from the rest of the film supply/pack and lifts the film sheet into an open set of rollers in the feed roller mechanism. The feed roller mechanism then closes its set of transport rollers and transports the film into a Vertical Transport Assembly.

SUMMARY OF THE INVENTION

An object of the present invention is to provide a film supply system for use with a laser imager.

Another object of the present invention is to provide such a film supply system which is robust and compact in size.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

The present invention provides a film supply system for use with a laser imager. In one preferred embodiment, the film supply system includes a cartridge receiving apparatus associated with a film pick-up mechanism. The cartridge receiving apparatus is preferably configured to receive and maintain a cartridge of photosensitive film. The film pick-up mechanism, in turn, is associated with the cartridge receiving apparatus and is preferably configured to separate and deliver individual sheets of photosensitive film from the film cartridge to a film transport system.

According to one aspect of the invention, there is provided a film supply system for use in an imager to separate sheets of photosensitive media from a film cartridge and deliver individual sheet of the photosensitive media to a film transport system. The film supply system comprises: a frame for attachment of the film supply system within the imager; a heel plate pivotably attached to the frame and actuatable by a motor; and a cup plate pivotably attached to the heel plate, the cup plate including at least one suction cup for selectively engaging a sheet of the photosensitive media.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
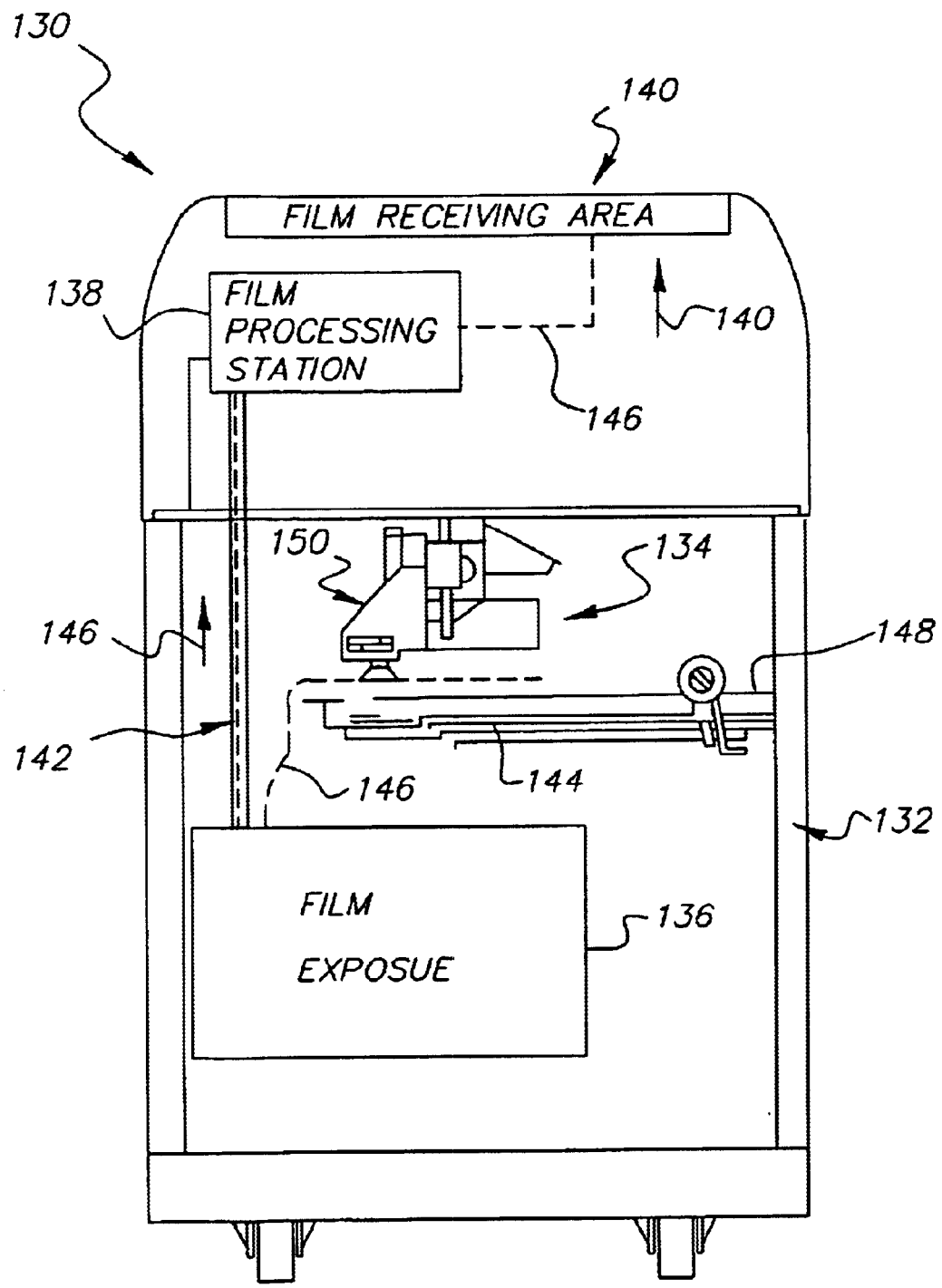
FIG. 1 generally shows a front view of a laser imager having a film supply system in accordance with the present invention.

The following is a detailed description of the preferred embodiments of the invention, reference being made to the drawings in which the same reference numerals identify the same elements of structure in each of the several figures.

FIG. 1 shows a front view of a laser imaging system 130 incorporating a film supply system in accordance with the present invention. The laser imaging system 130 generally includes an imager housing 132, a film supply system 134, a film exposure assembly 136, a film processing station 138, a film exit area 140 and a film transport system 142. It should be understood that each of the components of the laser imaging system 130 are shown generally in FIG. 1. Further details on the laser imaging system 130, and in particular the film supply system 134, are described in greater detail below.

The film supply system 134, the film exposure assembly 136, the film processing station 138, the film exit area 140 and the film transport system 142 are all disposed at various locations within the imager housing 132. During use, a cartridge of photosensitive film 144 is placed within the film supply system 134. Upon activation, the film supply system 134 retrieves a single sheet of photosensitive film (not shown). The sheet of photosensitive film is delivered by the film supply system 134 to the film transport system 142 for delivery to the film exposure assembly 136. Within the film exposure assembly 136, photographic images are exposed on the film from image data (e.g., digital or analog), using a laser imager. The thusly exposed film is then transported via the film transport system 142 to the film processing station 138 where the film is developed. After thermal processing, the film is cooled and transported via the film transport system 142 to the film exit area 140. For ease of illustration, the film travel path is represented by dashed lines 146.

As described in greater detail below, the film supply system 134 includes a cartridge receiving apparatus 148 and a film pick-up mechanism 150.

As indicated above, the film supply system of the present invention, also referred to as the Pickup Assembly, is comprised of an integrated pickup mechanism and a feed roller mechanism. The pickup mechanism separates the top sheet of film from the rest of the film supply/pack and lifts the film sheet into an open set of rollers in the feed roller mechanism. The feed roller mechanism then closes its set of transport rollers and transports the film into a Vertical Transport Assembly.

The supply system of the present invention has a low profile design. It can be desirable for an imager to include more than one supply area, for example, a 3 film supply drawer system may be desired. As such, minimizing the height of the Pickup and Rollback Assemblies (i.e., the supply magazine) is important to the overall height of the imager, every inches saved in the height of the supply magazine saves in the height of the imager. Another factor in the height of the supply magazine is the lengths of the transported film. For example, one film that may be used in an imager is a 18×24 cm size with a transported length of 18 cm. This 18 cm film length drives both the roller pitch in the imager, and the desired pitch between supply magazines because the magazines should try to match the roller pitch in the Vertical Transport Assembly otherwise the Vertical Transport design would not be symmetric. 172 mm is another Supply Magazine and Roller Pitch used in the imager.

Another feature of the present invention is a pickup head. The Pickup Assembly is configured to pickup most all size film in any Supply Magazine. As such, the Pickup head design should be no wider than the narrowest film width fed. If the narrowest film is 24 cm, or 240 mm. Thus, the width of the Pickup Head should be less than this value, clearance on both sides as the Pickup head to allow penetration of the film cartridge.

Another feature of the present invention is throughput. It is desirable that the throughput of an imager be high. Thus, the image must provide for such throughput.

Film supply system 134 is now more particularly described with reference to FIGS. 2 through 15.

Figure 2:
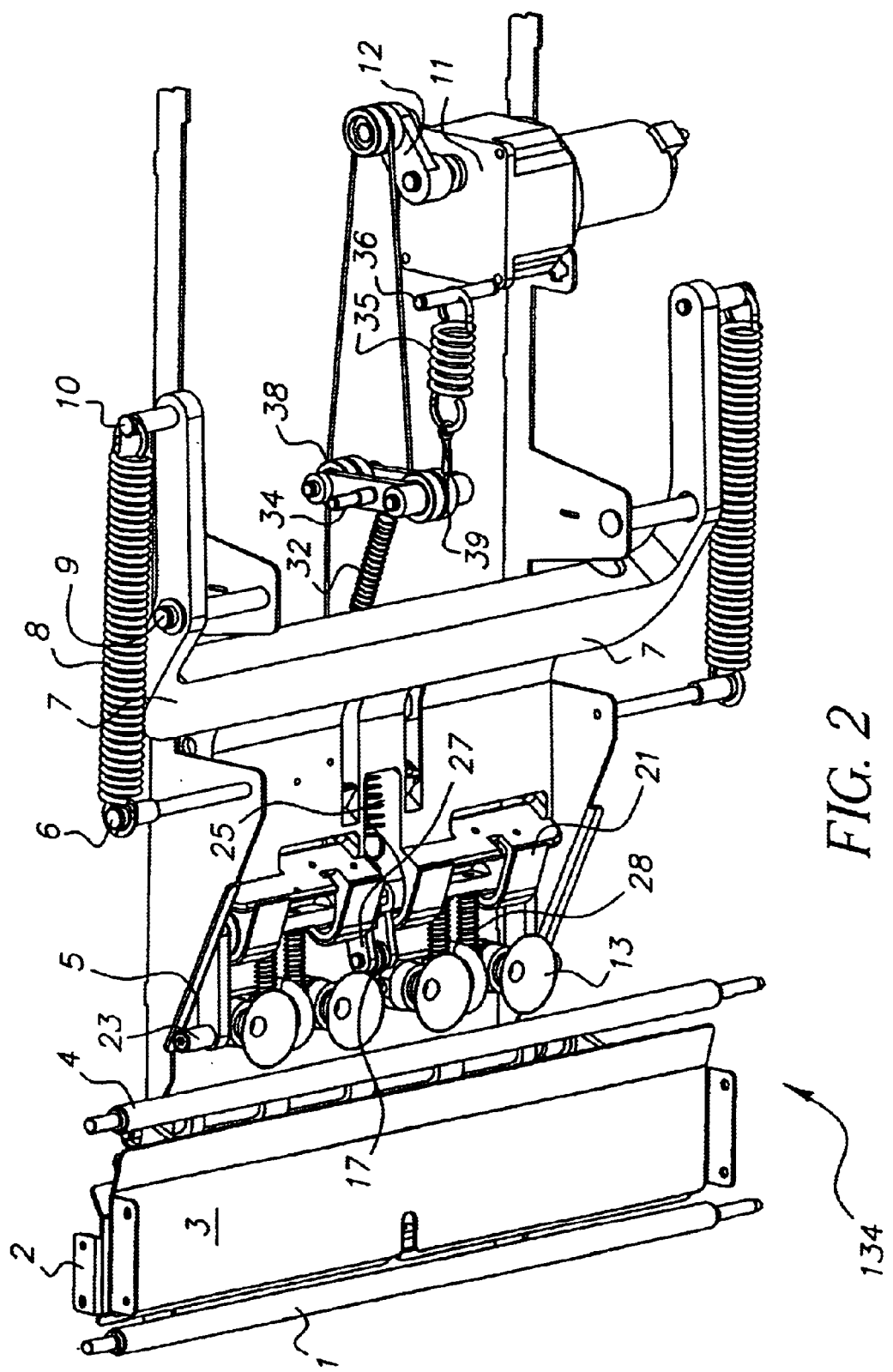
FIG. 2 shows an isometric view of the film supply system in accordance with the present invention.

FIG. 2 shows an isometric view of the film supply system in accordance with the present invention. As best shown in FIG. 2, Pickup Assembly 134 includes of a heel (7) that is pivotally attached to the pickup frame through two heel pins (9). The ends of the heel springs (8) are attached to arms (10) on the heel and a spring pin (6) mounted to the pickup frame. The heel (7) is actuated by a DC gear motor (11).

Figure 3:
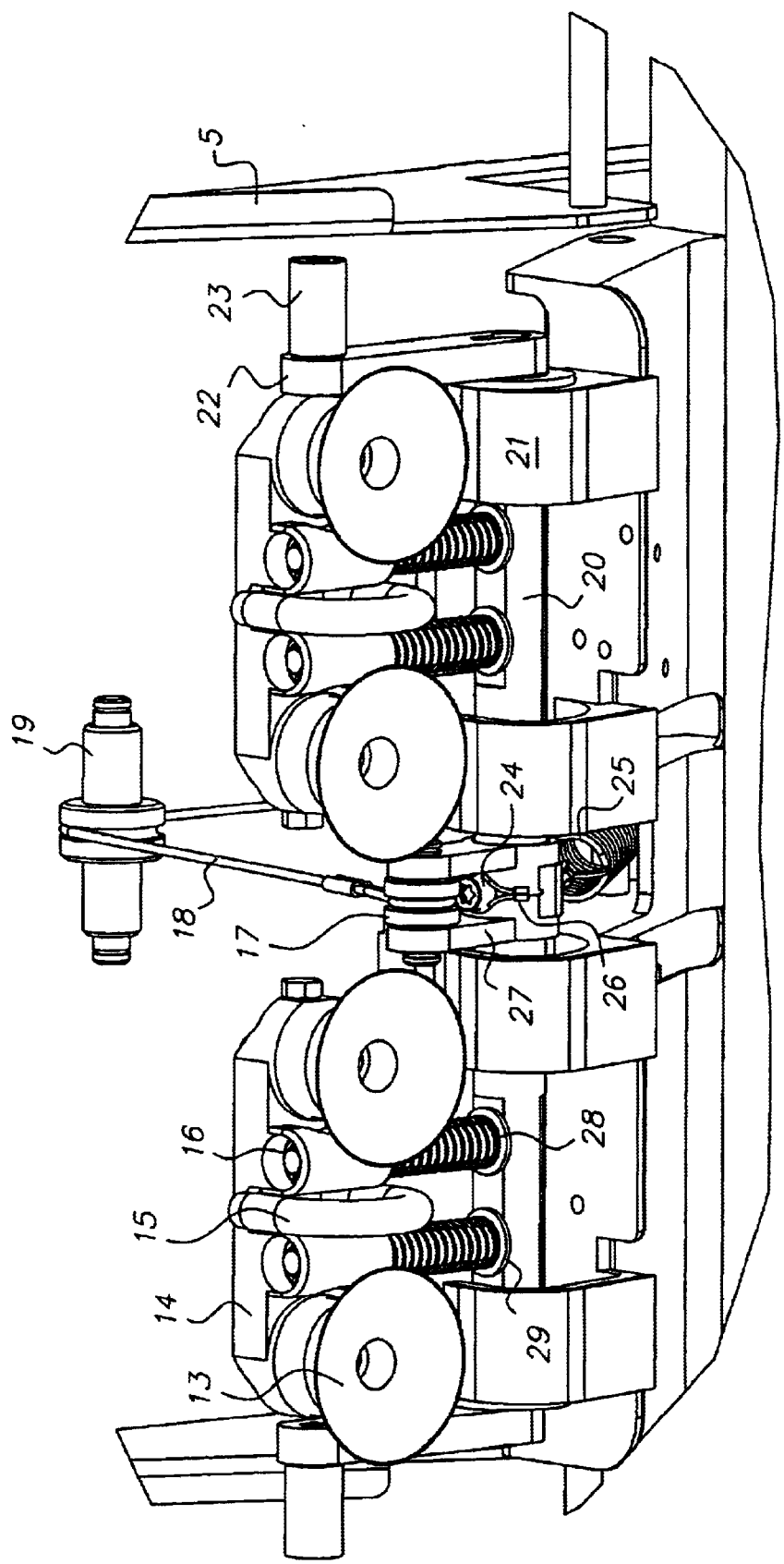
FIG. 3 shows an isometric view of a portion of the film supply system of FIG. 2.

FIG. 3 shows an isometric view of a portion of the film supply system of FIG. 2. As shown in FIG. 3, cup pivot shaft (20) is pivotally attached to a front section of the heel (7). A pair of pivot arms (22), four carriage pins (29), and a cable arm (27) are rigidly attached to the cup pivot shaft (20). Two cup carriages (14) slide up and down on the carriage pins (29) and are biased outward away from the cup pivot shaft (20) by four carriage springs (28). Four e-rings (16) mechanically captivate the cup carriages (14) at the ends of the carriage pins (29). A pair of suction cups (13) and a silicone loop (15) is attached to each cup carriage (14). The suction cups are connected to a vacuum pump and solenoid valve through with silicone tubing. Preferably, all the suction cups are routed through the same line, when the vacuum is released by the solenoid valve, the vacuum is released to all cups at once. As such, if the vacuum seal is broken at any of the suction cups, the vacuum is released to all cups.

The end of the drive cable (18) loops around the cable pulley (17) which is pinned to the end of the cable arm (27). The drive cable loops around the drive pulley 19 and travels back towards the dc motor (11).

One end of the pivot spring (25) is attached to a pivot spring cable (26) and the other end to the heel (7). The other end of the pivot spring cable (26) attaches to the cable arm screw (24) which locks the cable arm (27) to the cup pivot shaft (20).

Figure 4:
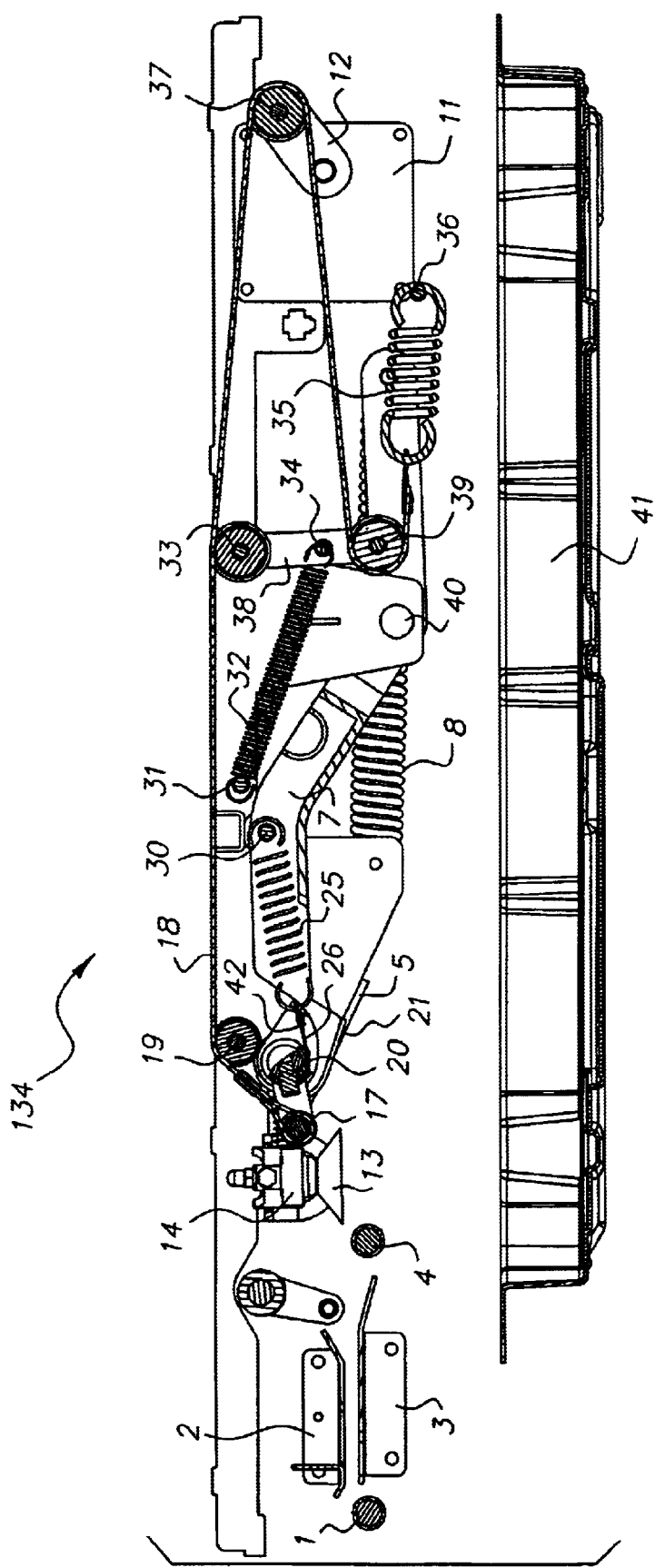
FIG. 4 shows a side of the film supply system of FIG. 2 in a home position.

FIG. 4 shows a side of film supply system 134 of FIG. 2 in a first (home) position wherein. As shown, drive cable

(18) loops over an idler pulley 33, loops around a motor drive pulley (37), and then back around another idler pulley (39) and attaches to drive cable spring (35). The other end of the drive cable spring (35) attaches to a pin (36) which is fixed to the pickup frame. The idler pulley (39) is pinned to the end of the idler link (38) which pivots relative to the pickup frame at the axis of idler (33). The idler link (38) is biased clockwise, away from the drive cable spring (35) with the idler spring (32) attached to the frame at pin (31) and to the idler link (38) at pin (34). This idler link assembly takes the slack out of the drive cable (18) and prevents it from disengaging from the pulleys.

The pickup operation of the film supply system is now described with reference to FIGS. 2–15.

FIG. 4 shows the pickup in the home position. This is the position where the heel pads and the suction cups are at their highest points. A home sensor mounted to the heel engages a home sensor flag at the top of the pickup frame to indicate this position.

Figure 5:
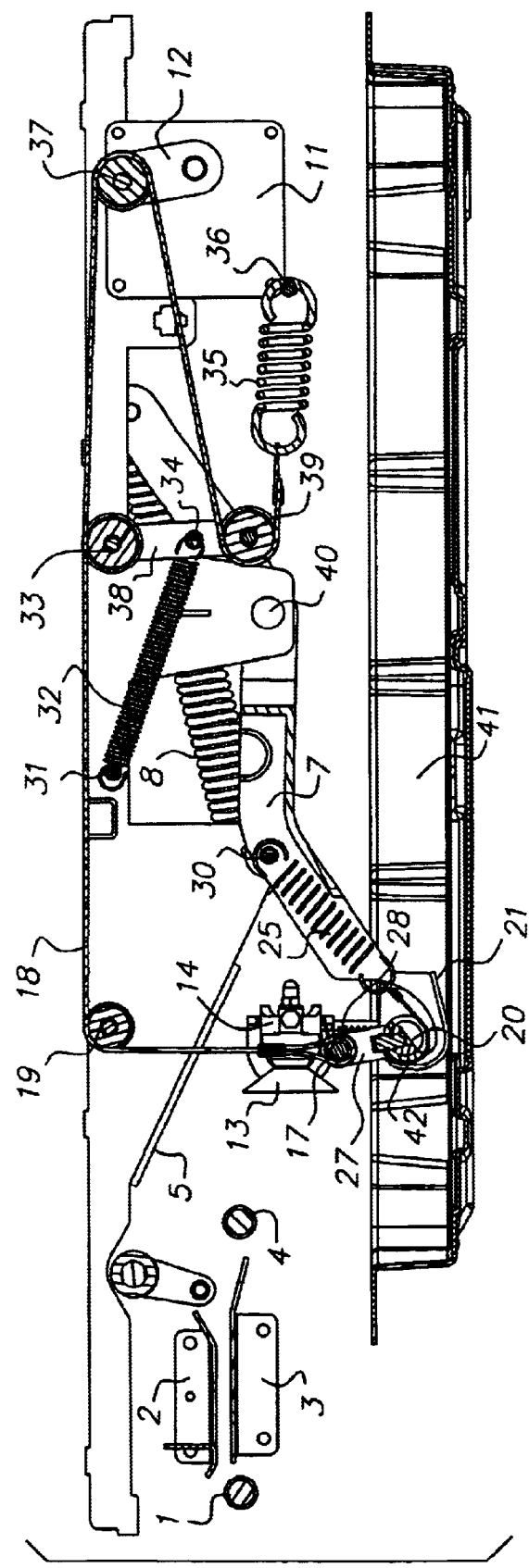
FIG. 5 shows a side of the film supply system of FIG. 2 in a film contact position.

FIG. 5 shows the film supply system in a film contact position. In FIG. 5, the dc motor (11) has turned counterclockwise which effectively feeds out the drive cable (18) allowing the heel (7) to rotate counterclockwise until the heel pads (21) make contact with the bottom of the a cartridge (41) with only 1 film in it, (i.e., the figure shows a nearly empty cartridge).

As the heel (7) rotates down onto the film in the film cartridge (41), the arms (10) on the heel lift upwards and the resulting moment arm length between the axis of the heel springs (8) and the heel pins (9) steadily increases. This increases the magnitude of the resulting heel pad (21) force against the film when it makes contact with the film. Preferably, the downward force against the film is at a maximum at the bottom of the cartridge (41), preferably in the range of 10 to 15 lbs. total.

During the travel down from the home position (as shown in FIG. 4) to the film contact position (as shown in FIG. 5), the cup carriages (14) and suction cups (13) are nearly in a vertical position (90 dig from the film plane). Although the cup pivot spring (25) and cup pivot cable (26) wrap around the cable arm (27), creating a moment about the axis of the cup pivot shaft (20) which bias's the cup carriage assemblies towards a horizontal position, the preferred 10 to 15 lb. force on the drive cable (18) from the main heel springs (8) creates its own counteracting moment about the axis of the cup pivot shaft (20) which is proportional to the length of the cable arm (27). This moment created by the drive cable (18) and main heel springs (8) keeps the cup carriages (14) in a nearly vertical position until the heel pads (21) contact the film.

Figure 6:
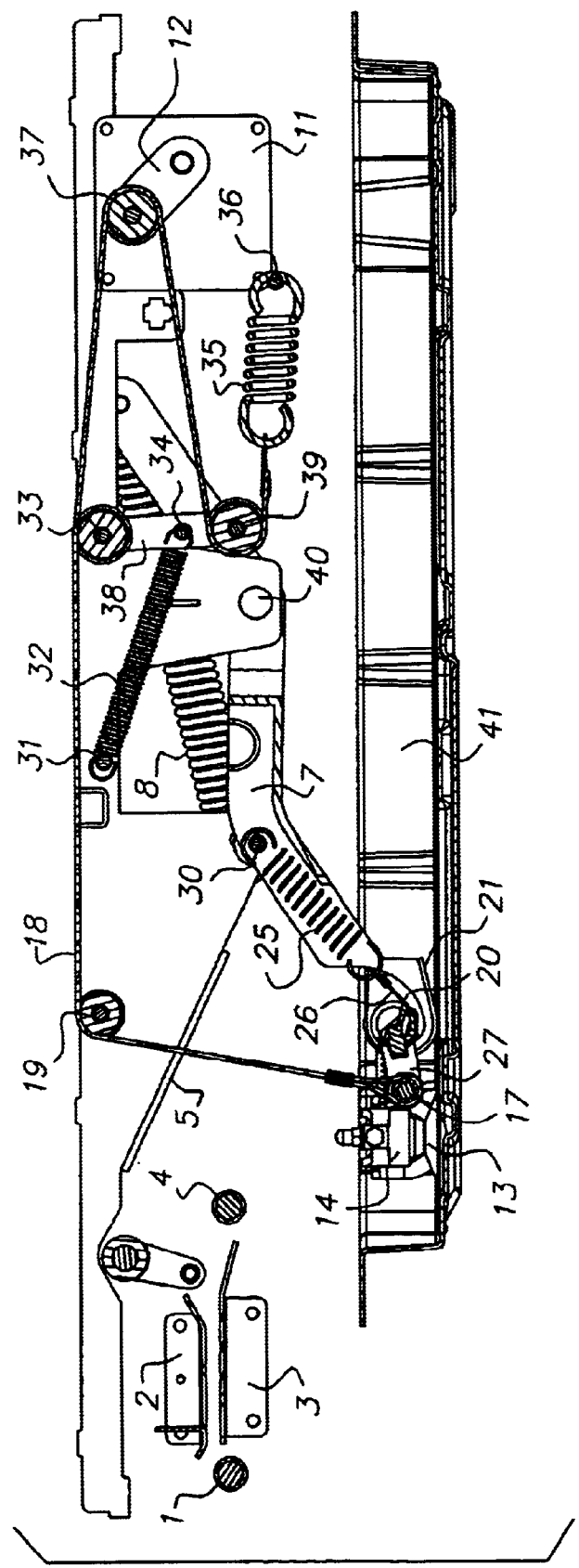
FIG. 6 shows a side of the film supply system of FIG. 2 in a cups engaged position.

Referring now to FIG. 6, there is shown the film supply system in a cups engaged position. As shown in FIG. 6, once the heel pads (21) make contact with the film, the heel (7) can no longer rotate and the main heel springs (8) can no longer influence the position of the cup carriage (14). At this point, the rotation of the cup carriage (14) and the cup pivot shaft (20) is governed by the cup pivot spring (25) which rotates the cup carriage assembly counterclockwise as shown in FIG. 6. The motor driver (12) continues to turn counterclockwise, feeding out more cable, which allows the cup carriage assembly to rotate until the suction cups (13) plant down onto the film. This is referred to as the Cups Engaged Position.

The cable arm (27) is shaped (42) such that the moment arm is at a maximum in this Cups Engaged position. This rotational moment creates a suction cup (13) force against the film which helps create the vacuum seal.

A parameter in the calculation of the film engagement (shown later) is the suction cup depth, which is the distance between the leading edge of the film and the center if the planted suction cups.

Figure 7:
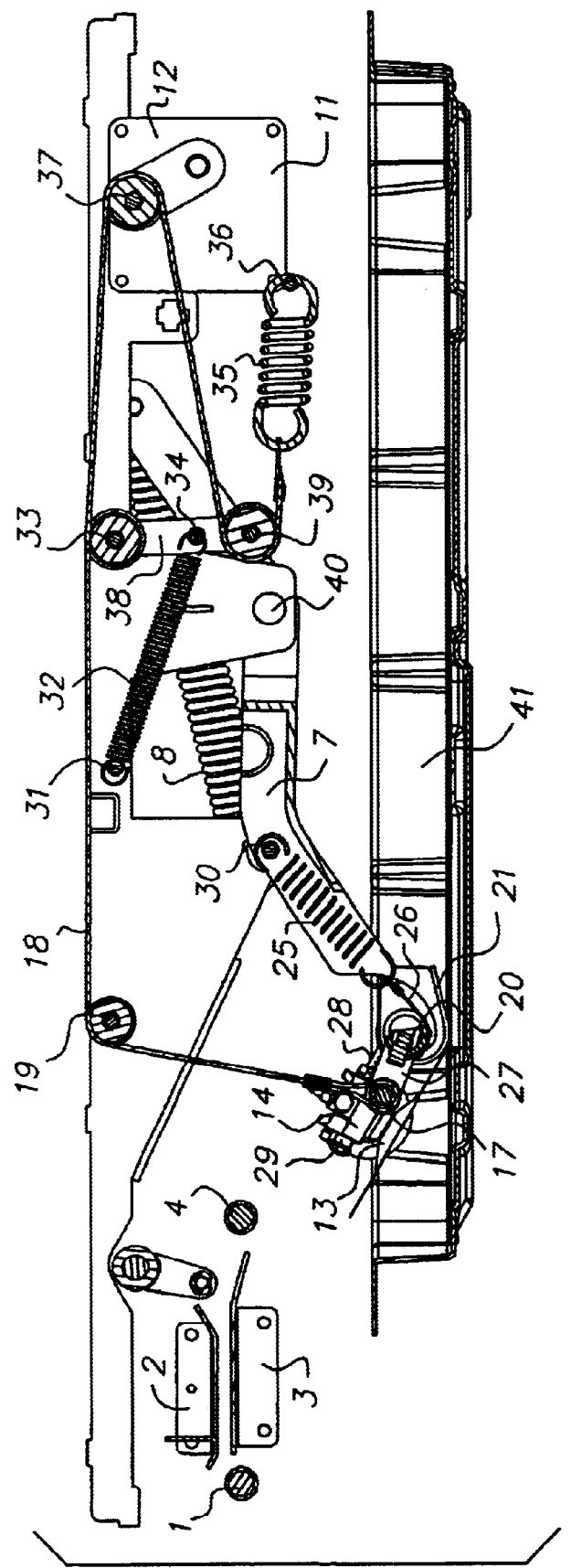
FIG. 7 shows a side of the film supply system of FIG. 2 in a pre-pump position.

FIG. 7 shows the film supply system in a pre-pump position. Once the suction cups (13) plant onto the film, a vacuum seal is made between the cups and the film. At this point, the dc motor (11) reverses direction and the drive cable (18) begins retracting. As the drive cable (18) pulls upwards on the cable pulley (17), the cup carriage assembly rotates clockwise as shown in FIG. 7, lifting the from edge of the film. The position shown in FIG. 7 is the Pre-Pump position. The pickup operation includes pumping the film between the Cups Engaged Position and the Pre-Pump Position from 1–3 times to separate the top sheet(s) of film from the bulk of the film pack. This operation is critical because if the cup carriage assembly rotates further, the force required to bend several sheets of film could cause the heel pads (21) to lift off the film and cause one or more films to kick forward onto the adhesive of the cartridge.

It is preferred that no more than 5 sheets of film should be left on the lifted film stack to prevent the heel (7) from lifting when rotating the cup carriage assembly to the next position. It has also been noted that the narrow width film sizes (e.g., 8×10 inch, and 10×12 inch) need more pre-pump cycles to break the pack.

An additional mechanism which can be used to aid in the separation of film sheets are the two silicone loops (15) that are mounted to the cup carriages. When the top sheets of film lift upwards away from the pack, these silicone loops press downward on the film creating a wave form along the leading edge of the film. This wave form produces additional relative motion between film sheets which helps separate them.

Figure 8:
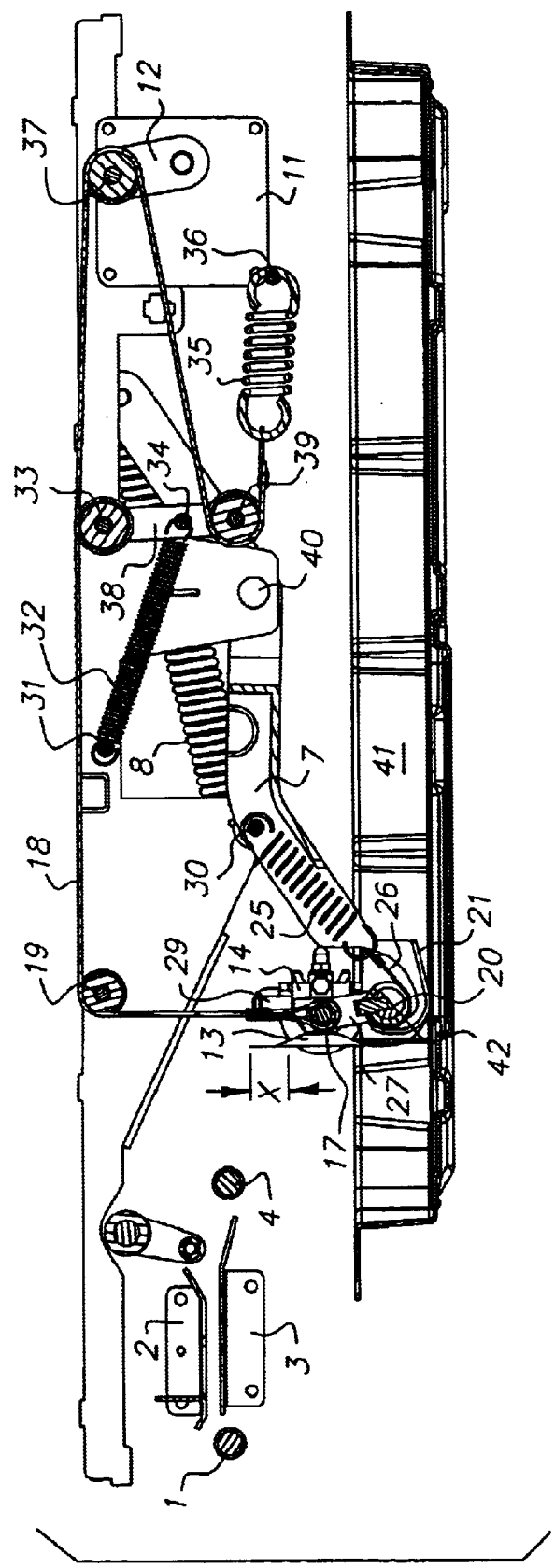
FIG. 8 shows a side of the film supply system of FIG. 2 in a max bend position.

Referring now to FIG. 8 here is shown the max bend position. After the pre-pump operations, the dc motor (1) continues to rotate clockwise and the cup carriage assembly rotates clockwise to an approximately vertical position called the maximum bend position (as shown in FIG. 8). At this position, the dc motor (11) stops and the film is held with an approximately 90 degree bend for the maximum bend time, roughly 1–2 seconds.

The beam strength of the film and the wave generated in the leading edge of the film by the silicone loops (15) help separate the top sheet of film. As with the pre-pump process, the pickup cycles for 1–3 times between the maximum bend position and the cups engaged position.

As the film rotates from 0 to 90 degrees, the suction cups (13), which are vacuum sealed to the film surface, must slide downwards towards the cup pivot shaft (20) on the carriage pins (28). This cup sliding motion accounts for the accumulation of film, the radius of curvature, as the film bends. If the cups where prevented from sliding, they would tear off the film. The Cup Carriage Movement (referenced in FIG. 8 as dimension x) is the measure of the cup carriage assembly movement along its carriage pins (29). The total cup carriage movement from a 0–90 degree rotation is approximately 25 mm.

Figure 9:
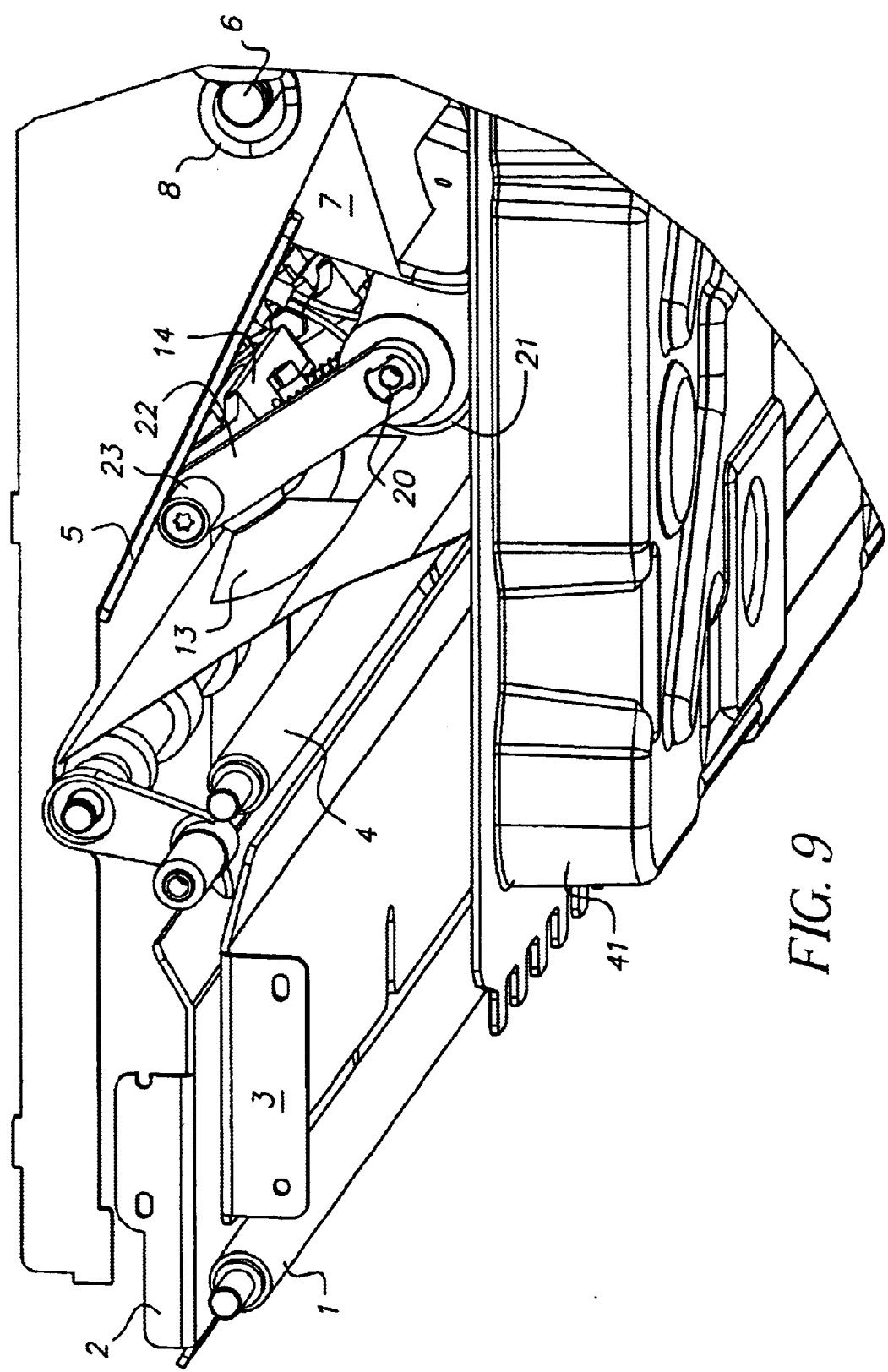
FIG. 9 shows an isometric view of a portion of the film supply system of FIG. 2.

FIG. 9 shows a further illustration of the film supply system.

Figure 10:
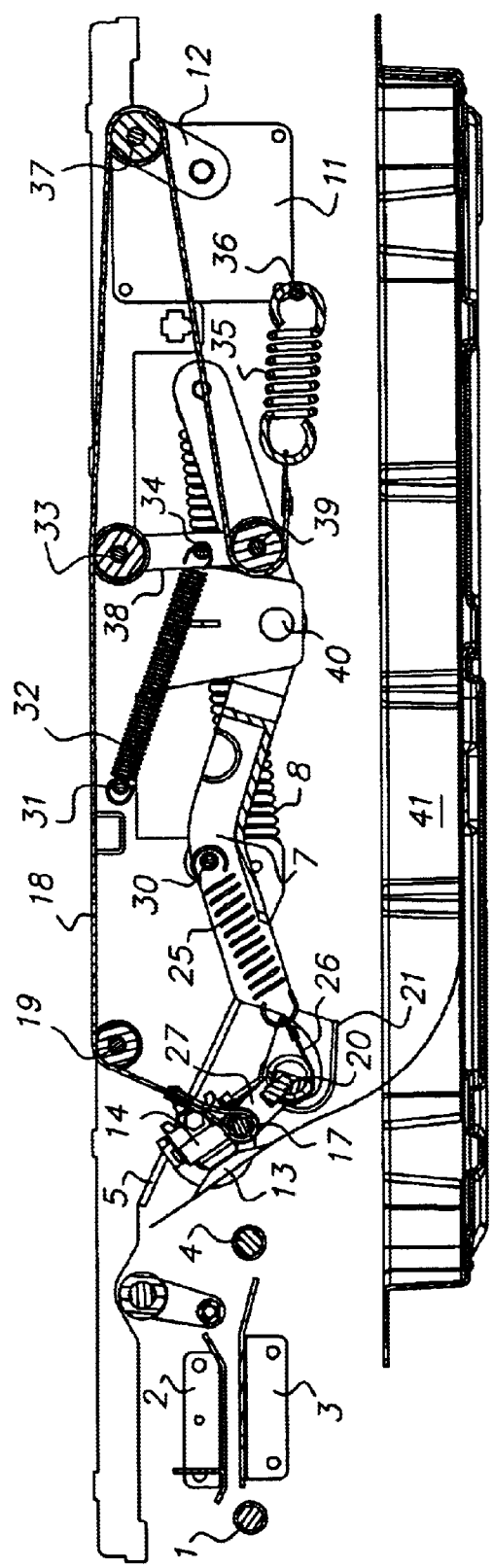
FIG. 10 shows a side of the film supply system of FIG. 2 in a film lift position.

FIG. 10 shows the film lift position. When the heel leaves the maximum bend position, the heel (7) lifts off the film. The film separation process must be successful (only one sheet attached to cups) at this point or, either multiple sheets would be fed, or, 1 or more sheets would be kicked forward onto the adhesive of the cartridge.

As the pickup lifts the film, the pivot rollers (23) attached to the pivot arms (22) contact an angled shelf (5) on the pickup frame. This causes the cup pivot shaft (2) and attached cup carriage assembly to rotate counterclockwise until the carriage assembly is back to a horizontal position. This has the effect of moving the leading edge of the film up, over the lower drive roller (4) and then forward in between the open roller set.

Figure 11:
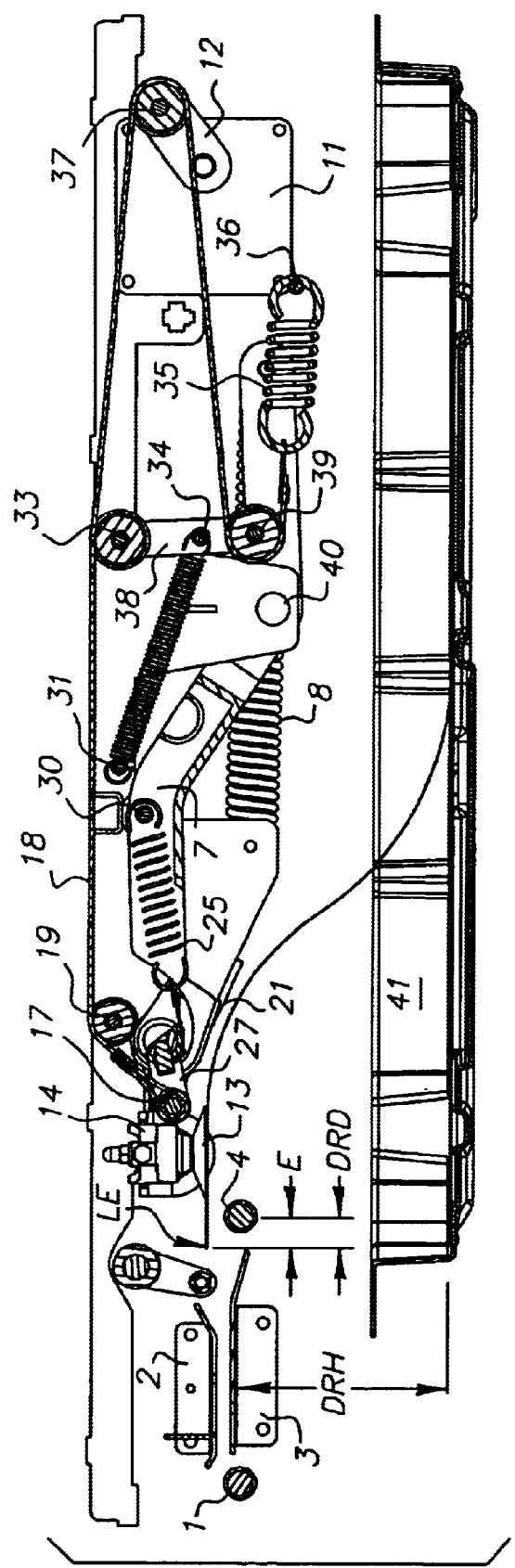
FIG. 11 shows a side of the film supply system of FIG. 2 in a home position.

FIG. 11 shows the pickup in its final Home Position. (The leading edge of the film is noted as LE.) The cup carriage assembly is in a horizontal position with the leading edge of the film LE in between the open roller set. At this point, the feed roller mechanism is energized, and the idler roller closes onto the drive roller (4). Once the film is secured between the feed rollers, the solenoid valve is energized and the vacuum is released to the suction cups (13). Once the suction cups (13) detach from the film, the film is then ready to be transported into the vertical assembly.

One dimension related to the performance of the pickup assembly is the engagement, shown in FIG. 11 as dimension E. The engagement is the horizontal distance from the leading edge of the film to the center of the drive roller (4). The engagement can be thought of as the amount the film overlaps the drive roller (4). It is important because if the engagement is too low, the film could drop out of the rollers, or, be skewed as it feeds through the rollers. If there is too much engagement, the film edge could hit the drive roller when its lifted from the cartridge. This will be shown in the following sections.

Two design parameters that enter into the calculation of the engagement include the drive roller depth, and the drive roller height. The drive roller depth DRD is the horizontal distance between the leading edge of the film and the center of the drive roller (4). The drive roller height DRH is the vertical distance from the top of the polypropylene liner in the bottom of the cartridge to the center of the drive roller (4).

When the pickup travels to the home position, the pickup home sensor engages a flag at the top of the pickup frame. If this sensor were to fail, the pickup heel would be prevented from rotating any further by hard stops at the top of the frame. The dc motor (11) would keep running because of the sensor failure, and the motor pulley (37) would continue turn until it went over top dead center. Once the heel could no move, the drive cable (18) could no longer retract any further. The cable extra length required to allow the motor pulley to travel over TDC comes from the extension of the cable spring (35). This mechanism has been designed to prevent the geared dc motor from stalling during a home sensor, or software failure. Stalling such a powerful motor could cause substantial damage to the motor itself or other pickup components.

Figure 12:
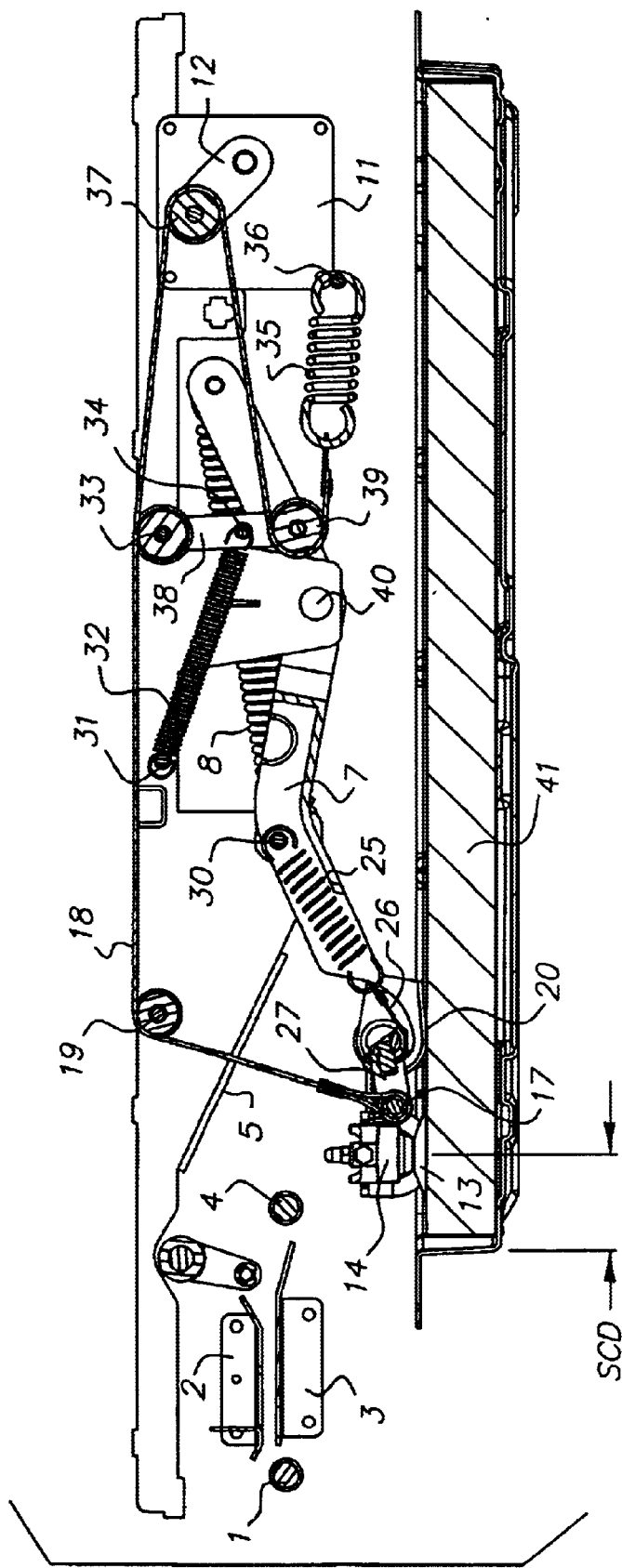
FIG. 12 shows a side of the film supply system of FIG. 2 in a cups engaged position with a full film cartridge.

FIG. 12 shows the pickup in the Cups Engaged Position with a full film cartridge. Here the value of the Suction Cup Depth SCD is approximately 6 mm less than the Suction Cup Depth at the bottom of the cartridge because of the dimensional relationships between the pivot point of the heel, the pivot point of the cup carriage, and the depth of the film pack.

Figure 13:
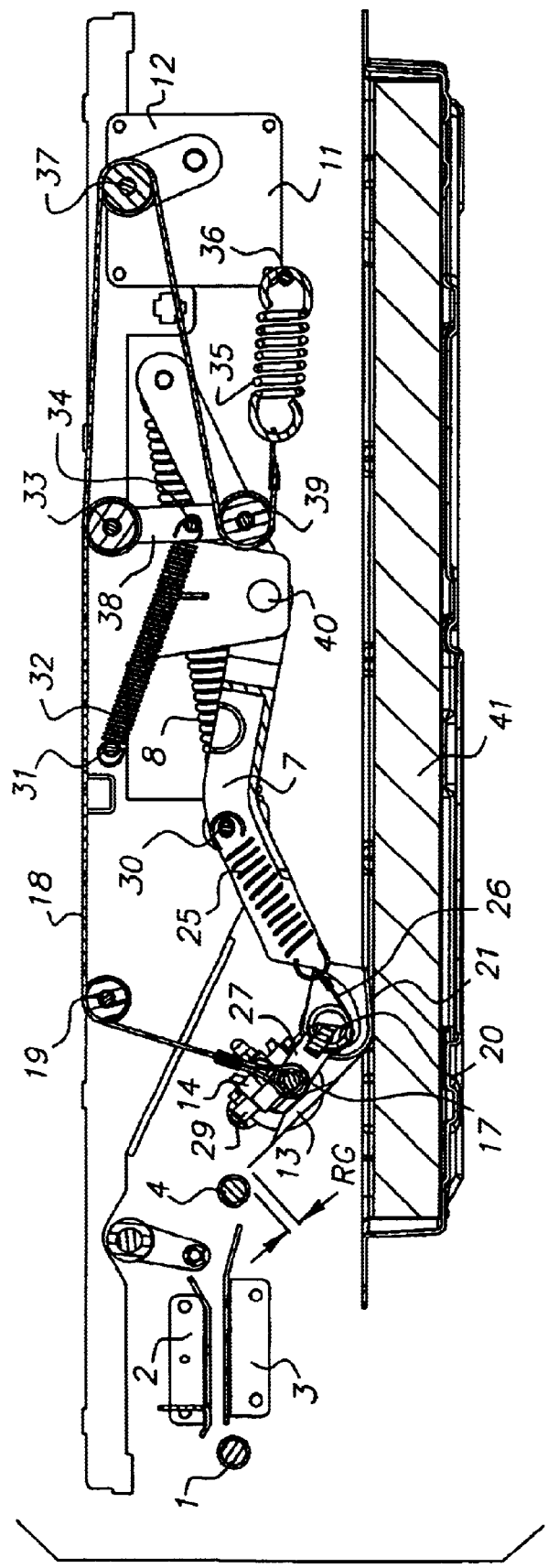
FIG. 13 shows a side of the film supply system of FIG. 2 indicating a roller gap position.

FIG. 13 shows the another parameter in the performance of the pickup. The roller gap RG is defined as the minimum clearance between the leading edge of the film and drive roller (4) as the film rotates past the roller, either in traveling up to the maximum bend position, or down to the cups engaged position. The roller gap is important because if it becomes less than zero and there is a substantial interference between the film edge and the drive roller, the pivot spring (25) may not have enough force to rotate the cup carriage assembly down to the cups engaged position. This roller gap is highly dependent on the drive roller depth and drive roller height. To increase the amount of engagement, the drive roller depth can be increased, but this reduces the roller gap and increases the risk of film edge/drive roller interference.

Figure 14:
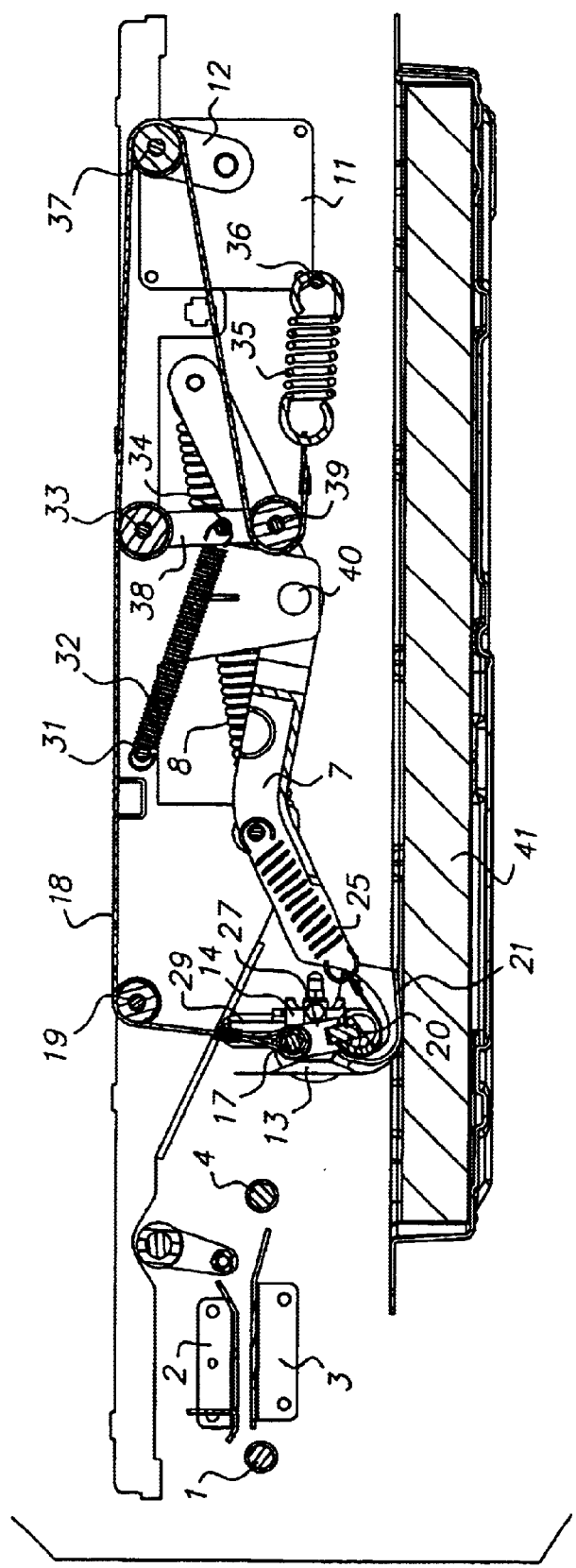
FIG. 14 shows a side of the film supply system of FIG. 2 in a maximum bend position with a full cartridge.

FIG. 14 shows the pickup at the maximum bend position with a full cartridge. Because the height of the pickup assembly has been minimized, the pivot rollers (23) just come into contact with the angled shelf (5) of the frame at this position when the cartridge is full.

Figure 15:
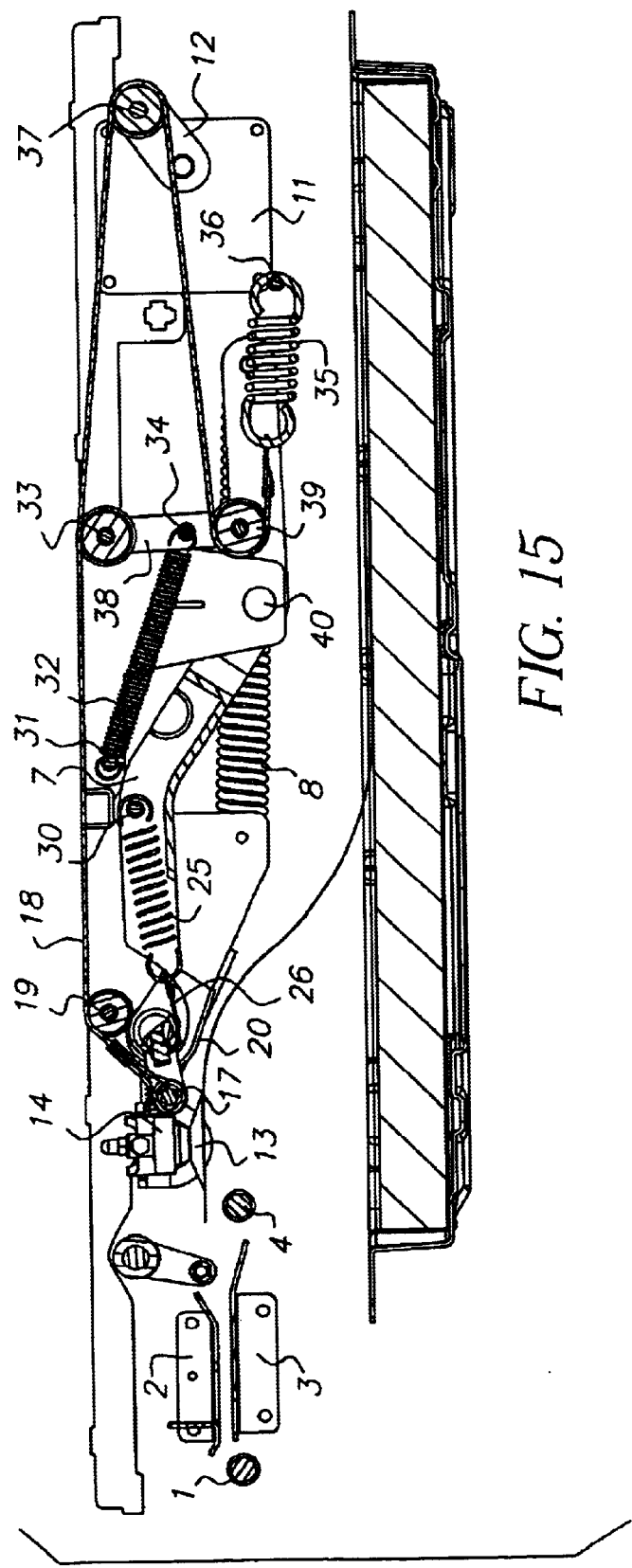
FIG. 15 shows a side of the film supply system of FIG. 2 in a home position with a full cartridge.

FIG. 15 shows the pickup in its home position with a full cartridge. Since the suction cup depth was less in the full cartridge than the empty cartridge, the resulting engagement is also less by approximately 6 mm. This indicates that any engagement related problems in the pickup will be at its worse when the cartridge is full. Design optimization involves increasing the drive roller depth until the roller gap is at its minimum allowed value. This will maximize the engagement for both the empty and full cartridges.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A film supply system for use in an imager to separate sheets of photosensitive media from a film cartridge and deliver individual sheet of the photosensitive media to a film transport system, the film supply system comprising:

a frame for attachment of the film supply system within the imager;

a heel plate pivotably attached to the frame and actuatable by a motor; and a cup plate pivotably attached to the heel plate, the cup plate including at least one suction cup for selectively engaging a sheet of the photosensitive media.

* * * * *